(12) United States Patent
Hopkins et al.

(10) Patent No.: US 6,780,208 B2
(45) Date of Patent: Aug. 24, 2004

(54) METHOD OF MAKING PRINTED BATTERY STRUCTURES

(75) Inventors: Glen A. Hopkins, San Diego, CA (US); Winthrop D. Childers, San Diego, CA (US); Howard A. Doumaux, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 278 days.

(21) Appl. No.: 10/186,496

(22) Filed: Jun. 28, 2002

(65) Prior Publication Data

US 2004/0001998 A1 Jan. 1, 2004

(51) Int. Cl.⁷ .......................... H01M 6/40; H01M 6/00
(52) U.S. Cl. ..................................... 29/623.5; 429/124
(58) Field of Search .................... 29/623.5; 429/124

(56) References Cited

U.S. PATENT DOCUMENTS

| 4,751,126 | A | | 6/1988 | Oodaira et al. |
| 5,302,412 | A | | 4/1994 | Tamhankar et al. |
| 5,865,860 | A | * | 2/1999 | Delnick ..................... 29/623.5 |
| 6,031,458 | A | | 2/2000 | Jacobsen et al. |
| 6,503,831 | B2 | * | 1/2003 | Speakman ................. 438/674 |

OTHER PUBLICATIONS

"The Age of the Santa Machine," Christopher Barnatt, Director, Cyber Business Centre, Briefing Paper, May 8th 2001, 8 pages, http://www.nottingham.ac.uk/cyber/CBP-3DF.html.

* cited by examiner

Primary Examiner—John S. Maples

(57) ABSTRACT

A battery is made by drop on demand printing a first electrode pattern and a second electrode pattern, and applying an electrolyte region over a portion of the first electrode pattern and a portion of the second electrode pattern.

10 Claims, 4 Drawing Sheets

METHOD OF MAKING PRINTED BATTERY STRUCTURES

BACKGROUND OF THE DISCLOSURE

The subject disclosure is generally directed to battery structures, and more particularly to battery structures that are formed by drop on demand printing.

The number of electronic devices that utilize batteries is increasing, for example as a result of more portable devices being marketed, and are also becoming smaller. It can be difficult to make small batteries of different configurations.

BRIEF DESCRIPTION OF THE DRAWINGS

Features and advantages of the disclosure will readily be appreciated by persons skilled in the art from the following detailed description when read in conjunction with the drawing wherein.

DETAILED DESCRIPTION OF THE DISCLOSURE

Figure 1:
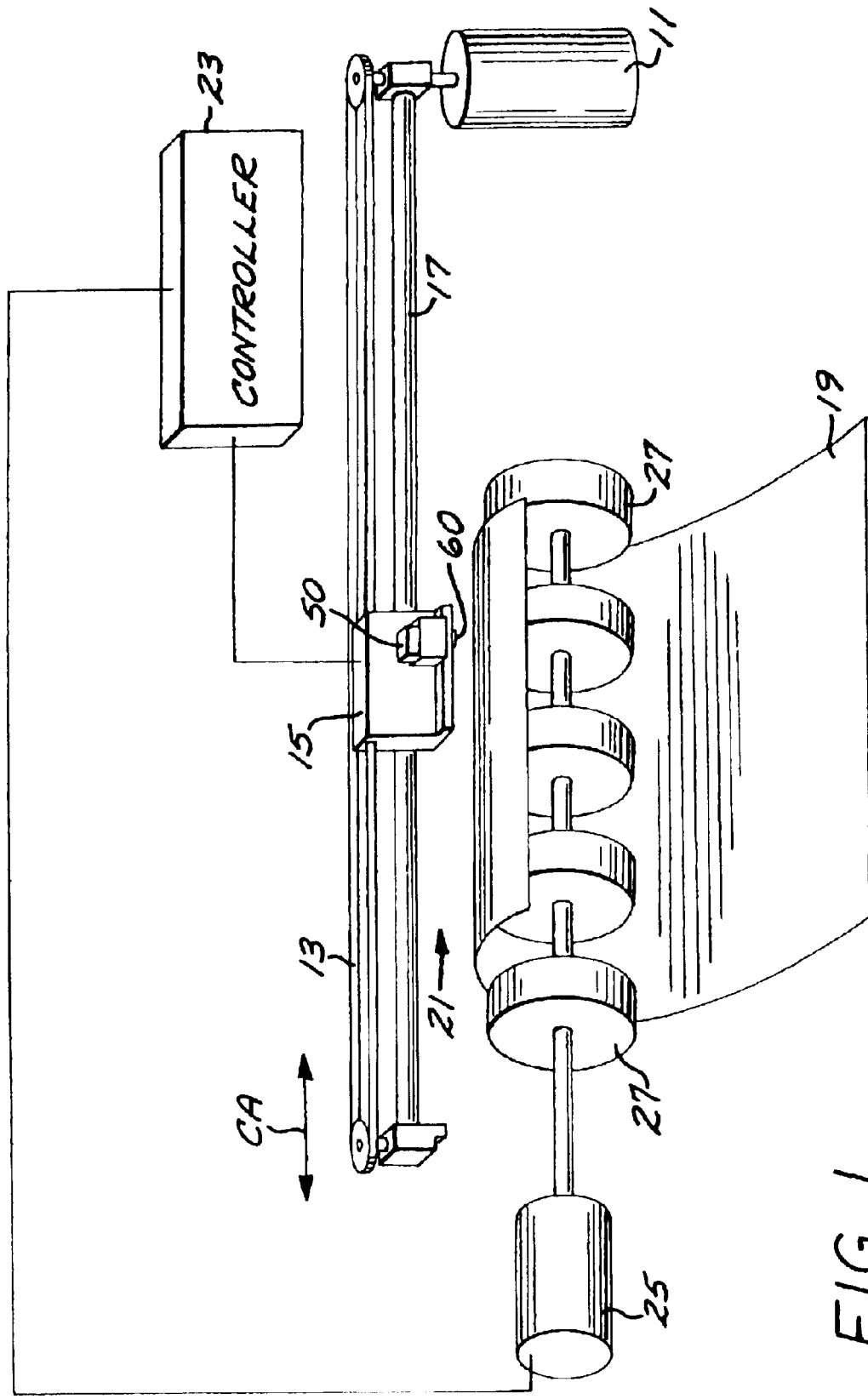
FIG. 1 is a schematic block diagram of an embodiment of a printing apparatus that can be used to print components of a battery.

FIG. 1 is a schematic block diagram of an embodiment of a drop on demand printing apparatus that can be employed to print battery structures such as those disclosed herein. The drop on demand printing system includes a carriage drive motor 11 that drives a drive belt 13 back and forth as the drive motor reverses direction. The drive belt 13 is attached to a print carriage system 15 that is slidably mounted on a slider rod 17, and the print carriage system thus scans laterally back and forth along a carriage scan axis CA from left to right and right to left. The print carriage system 15 includes one or more print cartridges 50 that can be mounted side by side, for example. Each of the print cartridges 50 includes a drop on demand drop emitting printhead 60 having a plurality of drop generators for depositing drops on a portion of a carrier medium 19 that is located in a print zone 21 that underlies the area or region swept by the drop generators as the print carriage 15 is scanned. The operation of the one or more print cartridges 50 can be controlled by a controller 23 that can also control the operation of the carriage drive motor 11.

The carrier medium 19 is more particularly supported and advanced through the print zone 21 by an appropriate media transport subsystem that can include for example a media advance motor 25, rollers 27 and suitable traction devices (not shown). The media advance motor 25 can also be controlled by the controller 23.

In this embodiment, each of the one or more print cartridges 50 can deliver one or more electrode forming liquids each having a carrier liquid and an electrode material such as metallic particles suspended in the carrier liquid, and can also deliver an electrolyte liquid. Each print cartridge 50 can include, for example, one or more on-board reservoirs for containing one or more liquids, and the printhead of a given print cartridge can emit drops of the one or more liquids contained in the print cartridge. For the illustrative example of an alkaline battery, one electrode forming liquid can contain zinc particles in suspension for printing of the anode, while another electrode forming liquid can contain magnesium dioxide and carbon in suspension for printing of the cathode. The electrolyte liquid can comprise potassium hydroxide or ammonium chloride, for example. The one or more cartridges 50 can also contain a conductive trace forming liquid for printing of a conductive trace that serially connects a plurality of batteries. An example of a conductive trace forming liquid can be a carrier liquid that contains palladium particles suspended in the carrier liquid.

By way of illustrative example, the drop on demand drop emitting printhead 60 can comprise a plurality of electrically addressable fluid drop generators that are selectively controlled by control signals provided by the controller 23 to emit fluid drops. The printhead 60 can comprise for example a thermal printhead or a piezoelectric printhead similar to thermal or piezoelectric drop emitting printheads employed in ink jet printers.

A suitable thermal drop on demand fluid drop emitting printhead can include, for example, an array of nozzles or openings formed in an orifice structure that is attached to or integral with a fluid barrier structure that in turn is attached to a thin film substructure that implements drop firing heater resistors and apparatus for enabling the resistors. The fluid barrier structure can define ink flow control structures, particle filtering structures, ink passageways or channels, and fluid chambers. The fluid chambers are disposed over associated fluid drop firing resistors, and the nozzles in the orifice structure are aligned with associated fluid chambers. To emit a fluid drop, a selected heater resistor is energized with electric current. The heater resistor produces heat that heats fluid in the adjacent fluid chamber. When the fluid in the chamber reaches vaporization, a rapidly expanding vapor front forces fluid within the fluid chamber through an adjacent orifice. An example of a thermal fluid drop generator employed in thermal ink jet printing can be found in commonly assigned U.S. Pat. No. 5,604,519.

A drop on demand printing system such as that depicted in FIG. 1 can be employed to make a battery as follows.

Figure 2A:
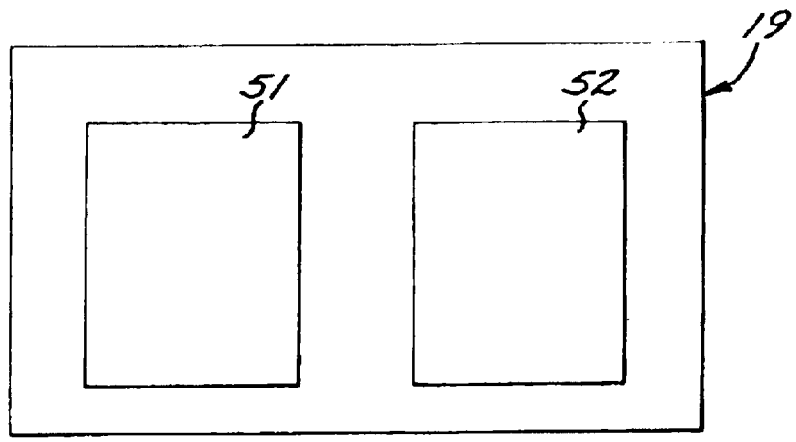
FIGS. 2A and 2B schematically illustrate an embodiment of electrode patterns of a battery that can be printed by a printing apparatus.
Figure 2B:
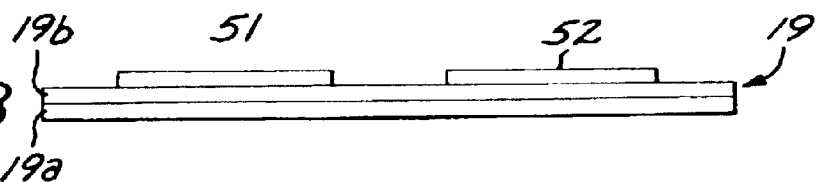

As shown in FIGS. 2A and 2B, a first electrode pattern 51 and a second electrode pattern 52 separated from the first electrode pattern are printed on a carrier medium 19 using at least one drop emitting printhead 60, for example in a manner similar to ink jet printing of images. One of the electrode patterns comprises the cathode of the battery while the other comprises the anode of the battery. The carrier medium 19 can be a dielectric material such as a mylar sheet. The carrier medium can more particularly comprise a substrate 19a such as mylar and a receiver layer 19b disposed on the printing side of the substrate for drawing the carrier liquid away from the electrode material. Heat can also be applied to drive off residual water or other volatile materials contained in the deposited electrode forming liquid. For example, heat can be used with a carrier medium that does not include a receiver layer, and also with a carrier medium that includes a receiver layer. The electrode patterns 51, 52 are preferably allowed to dry.

Figure 3A:
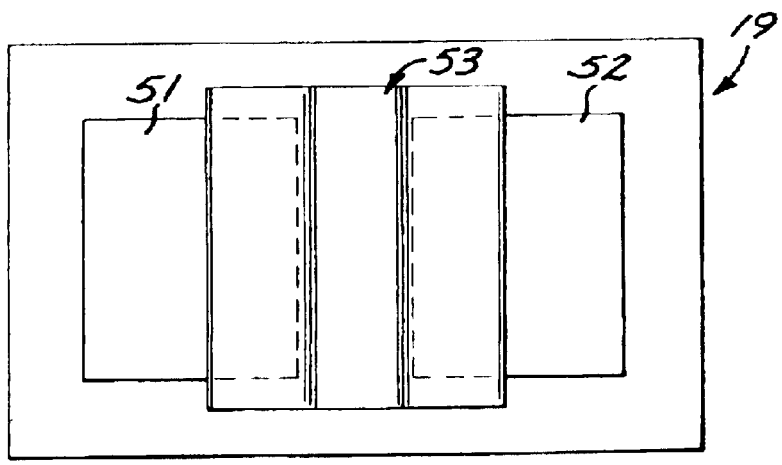
FIGS. 3A and 3B schematically illustrate an embodiment of an electrolyte region disposed over printed electrode patterns of a battery.
Figure 3B:
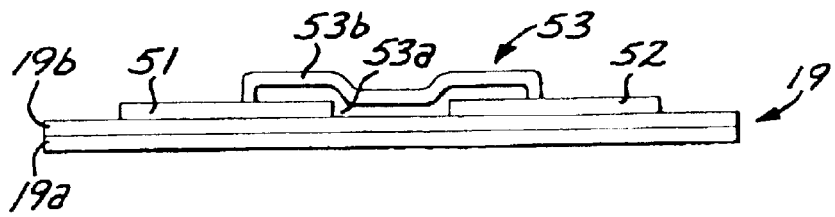

As shown in FIGS. 3A and 3B, an electrolyte region 53 is applied over a portion of the first electrode pattern 51 and a portion of the second electrode pattern 52 so as to span or bridge the first and second electrode patterns 51, 52. The first and second electrode patterns react with the electrolyte contained in the electrolyte region to deliver current to a circuit (not shown) that is electrically connected to the electrode patterns. The electrolyte region 53 is formed for example by wetting a medium 53a such as paper with an electrolyte such as a potassium hydroxide and water solution or other salt solution, and applying the wetted medium 53a onto portions of the electrode patterns 51, 52 and the carrier medium 19. The electrolyte carrying medium 53a can also contain materials that would be helpful in retarding the growth of metallic dendrites between the two electrodes of the battery. The electrolyte carrying medium 53a can be backed with a water impermeable layer 53b such as a metallized plastic sheet to reduce water loss from the electrolyte solution.

The electrolyte region can alternatively be printed, for example by emitting drops of an acrylate polymer solution and drops of an ammonium chloride electrolyte solution for a zinc battery. The acrylate polymer and the ammonium chloride form a gel when mixed. Also, the carrier medium 19 can include an agent for gelling an electrolyte solution that can be printed onto portions of the carrier medium and the electrode patterns.

Figure 4:
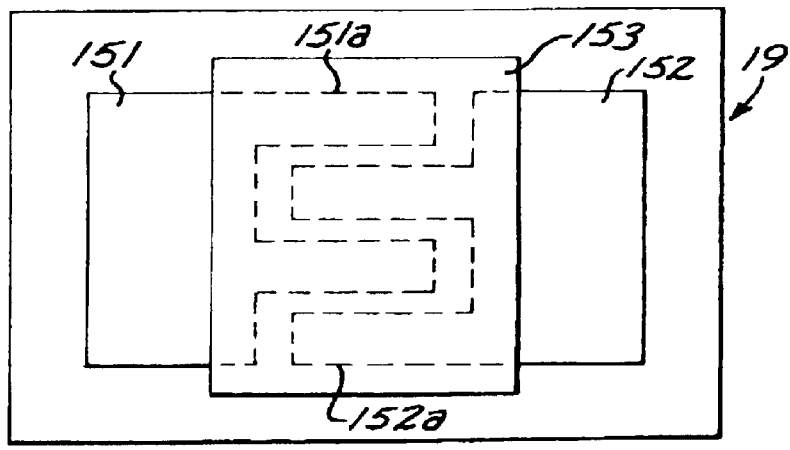
FIGS. 4, 5, and 6 are schematic plan views of embodiments of batteries having printed electrode patterns.

FIG. 4 is a top plan view of a further battery having electrodes that can be printed by a drop on demand printing apparatus such as that shown in FIG. 1. The battery includes a carrier medium 19, a first electrode pattern 151 having a square-wave shaped or comb-like boundary portion 151a that interfaces with or is adjacent a square-wave shaped or comb-like boundary portion of a second electrode pattern 152. The comb-like boundary portions underlie an electrolyte region 153 that bridges the first and second electrodes 151, 152. The comb-like boundary 151a of the first electrode pattern 151 forms a plurality of fingers that are non-contactively interlaced or interdigitated with a plurality of fingers formed by the comb-like boundary 152a of the second electrode pattern 152. The comb-shaped interface between the electrodes can increase the amount of current the battery can deliver.

Figure 5:
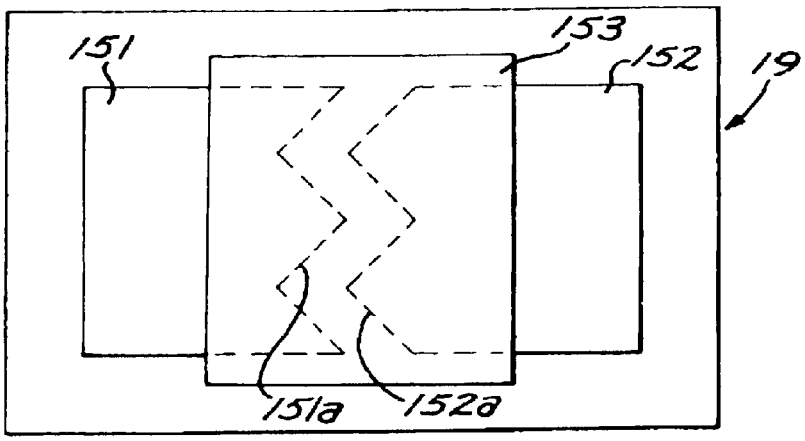
Figure 6:
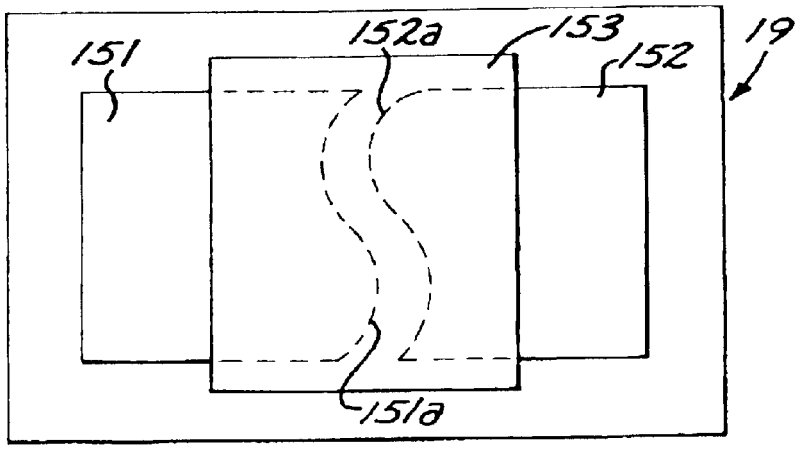

FIG. 5 is a top plan view of a battery having electrodes 151, 152 that include sawtooth-shaped opposing boundary portions 151a, 152a. FIG. 6 is a top plan view of a electrodes 151, 152 that include serpentine opposing boundary portions 151a, 152a. Other non-linear opposing boundary portions can be employed.

The batteries of FIGS. 4, 5 and 6 more generally include non-linear interfacing boundary portions that have an increased contour length along the interfacing boundary portions.

Figure 7:
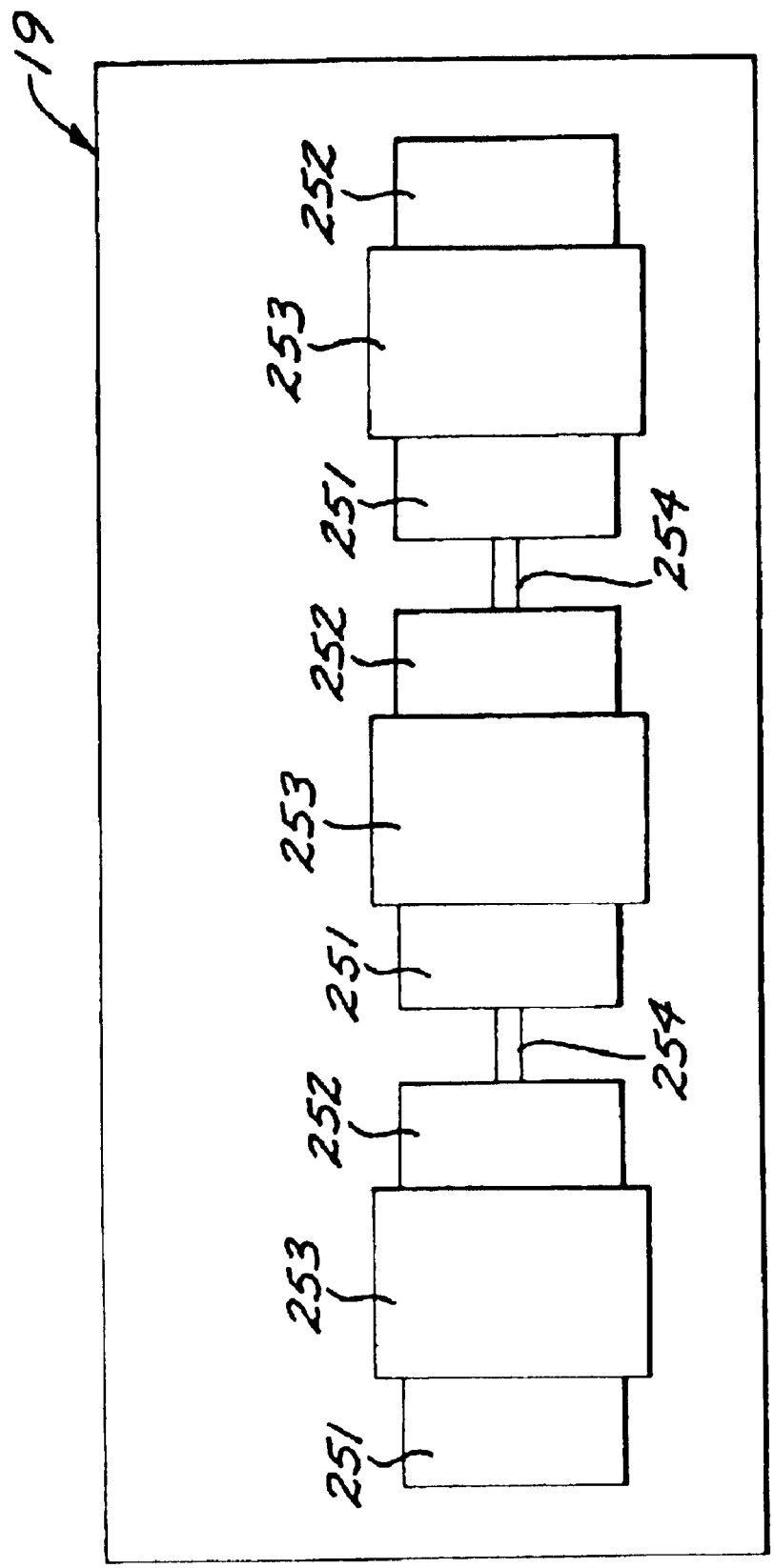
FIG. 7 is a schematic plan view of an embodiment of a plurality of batteries having printed electrode patterns and serially connected by a printed conductor.

FIG. 7 is a top plan view of a battery structure that includes a plurality of batteries that are serially connected by a conductive trace 254 that can be printed with an electrode forming liquid that contains a metal like palladium in suspension. Each battery includes a first electrode 251 and a second electrode 252 that can be printed on a carrier medium 15 as described above, and an electrolyte region 253 that can be applied as also described above.

Although the foregoing has been a description and illustration of specific embodiments of the invention, various modifications and changes thereto can be made by persons skilled in the art without departing from the scope and spirit of the invention as defined by the following claims.

What is claimed is:

1. A method of making a battery comprising:
   drop on demand printing a first electrode pattern and a second electrode pattern on a carrier medium; and
   applying an electrolyte region over a portion of the first electrode pattern and a portion of the second electrode pattern.

2. The method of claim 1 wherein drop on demand printing comprises thermally drop on demand printing the first electrode pattern and the second electrode pattern.

3. The method of claim 1 wherein drop on demand printing comprises piezoelectrically drop on demand printing the first electrode pattern and the second electrode pattern.

4. The method of claim 1 wherein drop on demand printing a first electrode pattern and a second electrode pattern on a carrier medium comprises drop on demand printing a first electrode pattern and a second electrode pattern on a carrier medium having a receiver layer.

5. The method of claim 1 further including heating the first electrode pattern and the second electrode pattern.

6. The method of claim 1 wherein drop on demand printing a first electrode pattern and a second electrode pattern on a carrier medium comprises drop on demand printing a first electrode pattern having a first electrode non-linear boundary portion and a second electrode pattern having a second electrode non-linear boundary portion adjacent the first electrode non-linear boundary portion.

7. The method of claim 1 wherein drop on demand printing a first electrode pattern and a second electrode pattern on a carrier medium comprises drop on demand printing a first electrode pattern having a first electrode comb-like boundary portion and a second electrode pattern having a second electrode comb-like boundary portion adjacent the first electrode comb-like boundary portion.

8. The method of claim 1 wherein drop on demand printing a first electrode pattern and a second electrode pattern on a carrier medium comprises drop on demand printing a first electrode pattern having a first electrode saw-tooth shaped boundary portion and a second electrode pattern having a second electrode saw-tooth shaped boundary portion adjacent the first electrode saw-tooth shaped boundary portion.

9. The method of claim 1 wherein drop on demand printing a first electrode pattern and a second electrode pattern on a carrier medium comprises drop on demand printing a first electrode pattern having a first electrode serpentine shaped boundary portion and a second electrode pattern having a second electrode serpentine shaped boundary portion adjacent the first electrode serpentine shaped boundary portion.

10. The method of claim 1 wherein applying an electrolyte region comprises drop printing the electrolyte region.

* * * * *